United States Patent [19]

Gutermuth et al.

[11] 4,256,092
[45] Mar. 17, 1981

[54] DEVICE FOR THE CONVERSION OF SOLAR RADIATION INTO HEAT

[76] Inventors: Paul F. Gutermuth, Augustastrasse 48, D-6456 Langenselbold; Heinrich W. Detjen, August-Bebel-Strasse 11, D-6451 Bruchköbel, both of Fed. Rep. of Germany

[21] Appl. No.: 16,691

[22] Filed: Feb. 28, 1979

[30] Foreign Application Priority Data

Mar. 6, 1978 [DE] Fed. Rep. of Germany ....... 2809547

[51] Int. Cl.³ .............................................. F24J 3/02
[52] U.S. Cl. .................................. 126/449; 126/450; 126/441; 126/432
[58] Field of Search ................ 126/441, 449, 450, 432

[56] References Cited

U.S. PATENT DOCUMENTS

| 3,102,532 | 9/1963 | Shoemaker | 126/441 |
|---|---|---|---|
| 4,054,125 | 10/1977 | Eckels | 126/449 |
| 4,091,793 | 5/1978 | Hermann et al. | 126/441 |
| 4,142,511 | 3/1979 | Doughty et al. | 126/449 X |

Primary Examiner—George T. Hall
Attorney, Agent, or Firm—Sughrue, Rothwell, Mion, Zinn and Macpeak

[57] ABSTRACT

A solar radiation converter includes a back insulated housing 14 having a glass front wall 12. A plurality of blackened, rotationally symmetrical balls 28 or cylinders 30 are pivotally disposed within the housing as absorber elements, and are turned by a flowing heat transfer medium, such as water, to thus present cooler surfaces of greater area for the more efficient absorption of incoming radiation.

10 Claims, 3 Drawing Figures

DEVICE FOR THE CONVERSION OF SOLAR RADIATION INTO HEAT

The invention relates to a device for the conversion of solar radiation into heat by means of absorbing elements preferably arranged side by side in a heat-insulated collector of which at least one surface is permeable to solar radiation, and which are traversed by a fluid medium.

In the known devices the absorbing elements consist e.g. of blackened metal sheets. The heat generated by the solar radiation, for the most part by convection, is then transferred to a fluid medium either flowing along the metal sheet or conducted through channels arranged in the absorbing element. As a suitable fluid medium one can use e.g. air or water. (DE-OS No. 25 28 267).

U.S. Pat. No. 3,102,532 also describes solar collectors in which the absorbing elements are traversed by a fluid medium.

The operational practicability of the known devices for the conversion of solar radiation into heat depends on the efficiency, thus on the ratio that the effective energy supplied by the device bears to the solar energy hitting the collecting surface. In this context that surface is called the collecting surface through which the radiation can get into the housing on the absorbing elements.

On continuous running, if the outlet temperature of the working means does not change temporally, the obtained available heat will equal the insolated solar energy minus the losses. These losses are mostly determined by reflection and absorption of the housing shielding, heat reflection of the shielding, heat emission by convection and conduction within the space between shielding and absorbing surface. Also the efficiency depends on the difference of temperature between the absorbing surface and the fluid medium. Although it is possible to reduce the losses resulting in connection with the shielding of the housing to a far extent by an appropriate selection of the heat-insulating material of the housing walls or, respectively, of the surface permeable to solar radiation, preferably being a laminated insulating glass, the improvement of efficiency by increasing the difference of temperature between the absorbing surfaces and the fluid medium causes some difficulties. Among others, the reason for this is due to the fact that in devices with a metal sheet as an absorbing element or with tubes flown through by a fluid medium serving as an absorbing element, the surface to which solar radiation is admitted is too small as compared to the radiation force passing through the entrance surface of the housing. In addition thereto, always the same surfaces are exposed to the solar energy. Thereby the absorbing elements are intensely heated so that a further solar energy absorption can take place to a small extent only. Although the fluid medium flowing along the absorbing elements is effecting a cooling and thus an improvement of efficiency by intensified absorption of the solar energy, it does by no means involve any economic utilization of the known devices to such an extent that conventional kinds of energy could be saved on a considerable scale.

It is therefore the object of the present invention to improve the device as described in the foregoing in such a manner as to increase the efficiency as compared to the conventional devices without necessitating any changes to the dimensions of the collectors accommodating the absorbing elements, i.e. to make them bigger. In addition thereto, the radiation energy affecting the absorbing elements shall be almost independent of the angle of incidence of the radiation. Still another object to achieve is that mostly cold surfaces will face solar radiation to absorb more energy per unit in time in comparison with the prior art.

According to the invention, the problem is solved in that the absorbing elements are rotationally symmetrical bodies preferably configured as balls or of spherical form, being pivotally arranged. By selecting these bodies it is possible to enlarge the surface of the elements absorbing the solar radiation so that the difference of temperature between the fluid medium and the absorbing surface is increased in toto. This again means an increase of efficiency. By the rotating arrangement it is guaranteed that the solar radiation is constantly hitting on surfaces being cooled off by the flowing fluid medium. By this configuration of the absorbing elements according to the invention there is afforded the possibility of an increased absorption of energy, thus almost doubling the efficiency as compared to the known devices. Due to the shape of the absorbing elements, the radiation hits the surface with the same angular distribution at each position of the sun. Consequently, a separate adjustment of the collector to the respective angle of incidence of the sun is not required anymore, as compared to the known devices with absorbing elements shaped like plates.

In an embodiment of the invention, the absorbing elements of rotationally symmetrical configuration can be cylinders or cylinder-shaped bodies, likewise being pivoted. This will result in almost the same advantages obtained by means of the balls or spherical bodies according to the system of the invention.

In order to obtain a rotation of the absorbing elements, in the embodiment of the invention there are provided recesses preferably being arranged in the flow course of the fluid medium. In order to allow the absorbing elements to rotate without any change of position, the ball-shaped absorbing elements e.g. can be arranged in a ball cage or supported by axles passing through their centers while the ends of the axles are fixed in the housing walls. A similar arrangement can be made for the cylindrical bodies.

According to the invention, the absorbing elements are preferably arranged on one level or several ones, running parallel or almost parallel to the surface permeable to the solar radiation. By arranging the absorbing elements on several levels running parallel to each other, there will be the advantage of a better radiation of heat to the flowing fluid medium.

In another embodiment of the invention, in a device for conversion of solar radiation into heat with at least one rotationally symmetrical absorbing element arranged in a heat-insulated collector permeable to solar radiation and being flown through and/or flown around by a fluid medium, there can be pivotally arranged a sole ball in the collector. This ball must be dimensioned accordingly in order to guarantee sufficient heat energy for e.g. the heating of water for industrial use. By the presence of one ball only in the collector, one will especially face no difficulties with the arrangement of the sun collector. It is not necessary to mount any large-surface arrangements in e.g. private homes. The latter namely could result in the entrance surfaces' for solar radiation producing undesired and to be avoided reflections that could obstruct the view of e.g. neighbors or drivers of vehicles. In a sun collector with a sole ball as an absorbing element, the collector is preferably adapted to the shape of the ball and mounted at sheltered places or even immediately on the ground. A special sighting toward the solar radiation is not required. Also in the embodiment the space between the ball and the collector can be filled partially by the fluid medium flowing around. Also in modification, the shape of the collector surrounding the ball can differ completely or partially from the symmetric shape of the ball.

Further details, advantages and characteristics of the invention will be apparent upon consideration of the following description of the annexed drawings, wherein FIG. 1 is a schematic view of a device for the conversion of solar radiation according to the invention;

Figure 1:
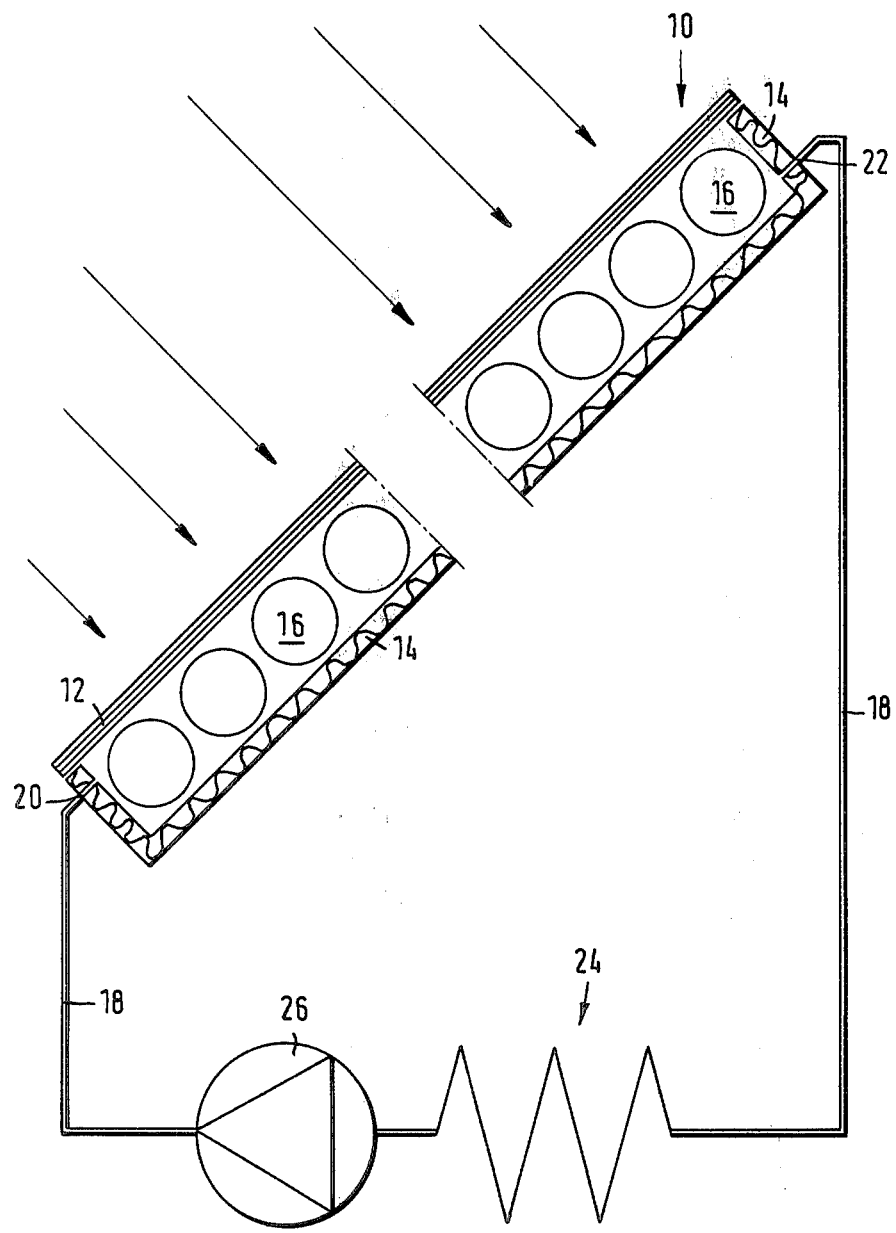

FIG. 1 shows schematically a device for the conversion of solar radiation into heat. A collector 10 consists of a preferably ashlar-shaped housing, of which the surface 12 facing the solar radiation is permeable at least to the heat radiation. Preferably this surface consists of laminated insulating glass. The other walls of the housing 14 have at least a heat-insulating inner lining that can also reflect the incident radiation. In the collector 10 there are arranged preferably blackened absorber elements 16 which absorb the radiation; these elements are described in more detail in conjunction with FIG. 2. The heat produced in the absorber elements by the absorption of the radiation, mostly through convection, is transferred to a fluid medium flowing through a pipe system 18. The fluid medium enters the collector 10 through an opening 20 to flow around the absorber elements 16 and thereby absorb heat. The heated fluid medium leaves the collector 10 through an outlet opening 22 in the wall opposite to the inlet opening 20 so that it can subsequently be supplied to a consumer 24. The circulation of the fluid medium can be effected e.g. by a pump 26 but likewise on the basis of gravity.

Figure 2:
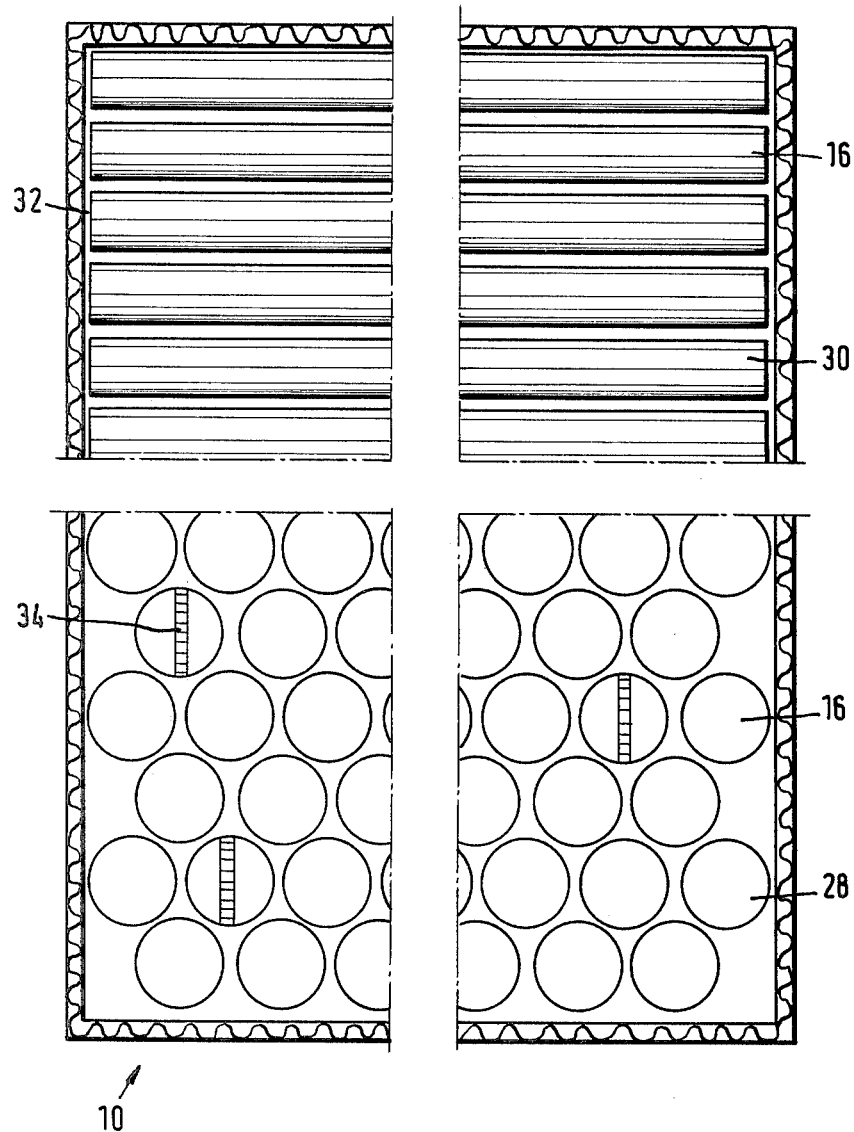
FIG. 2 are sectional views of arrangements of absorbing elements.

The absorber elements with ref. 16 in FIG. 1 are sectionally shown in FIG. 2. On one side there are shown ball-shaped absorber elements 28 and on the other side cylindrical absorber elements 30. The absorber elements 28 are arranged e.g. in rows side by side, whereby the balls are "packed" as close to each other as possible. The balls 28 arranged in a row can be supported e.g. by a common axle for pivotal bearing. They can also be accommodated in a ball cage which accomplishes the same purpose. The balls 28 arranged side by side can be positioned in one plane, however, they can also be on planes running parallel to each other. The distance between the ball surfaces of absorber elements arranged on a sole plane and the inner surface of the laminated insulating glass should be small so that there is only a thin water film between the balls and the inner surface. The fluid medium entering the collector 10 will now flow around the balls 28 in such a manner that they are rotated. To this effect recesses can be provided for, e.g. milled edges 34, presenting a resisting force to the fluid medium so as to allow a rotation of the balls at a desired speed.

By the rotation of the absorber elements the solar radiation will always hit on surfaces cooled off by the flowing fluid medium, so that these can easily absorb energy whereby again the efficiency of the device is improved.

Even if the absorber elements 16 are not pivotally mounted, there would nevertheless result an improvement of efficiency as compared to the known absorbing devices, since not only the surface of the absorber is enlarged but also the radiation will hit on the surface of the ball with the same angular distribution at each and every position of the sun. A separate adjustment of the collector 10 to the respective angle of incidence of the sun is not required anymore as compared to the known devices.

Besides the ball-shaped configuration of the absorber elements, these can also be of cylindrical shape, as likewise shown in FIG. 2. Ref. 30 indicates solid or hollow cylinders arranged side by side, being pivotally supported by axles 32. In order that the absorber elements 30 are rotated by the flowing fluid medium, one can likewise arrange recesses on the surface as indicated by ref. 34 for the ball-shaped absorber elements 28. The advantages described with respect to the ball absorbers 28 are, of course, also applicable to the cylindrical absorber elements 30. By rotation of the cylinders, always surfaces will face solar radiation that are cooled or respectively, cooled off.

Concerning the angle of incidence of the radiation, there are the same advantages as described in conjunction with the ball elements 18. It goes without saying that the invention is not restricted to cylinders or cylindrical, respectively balls or ball-shaped absorber elements only. One can rather use almost all rotationally symmetrical bodies as absorbing elements.

Figure 3:
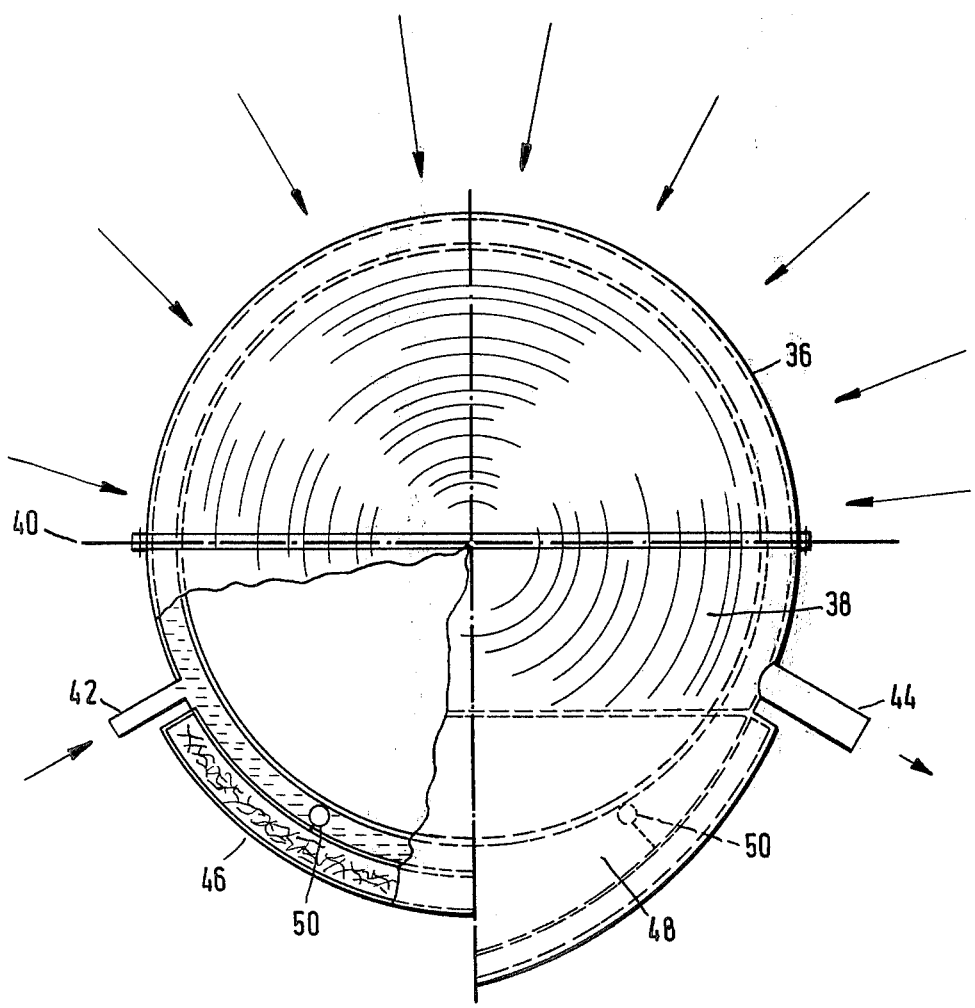
FIG. 3 is a side view of a sun collector with a sole absorbing element, partially sectional.

FIG. 3 is a schematic side view of a further embodiment of the device for conversion of solar radiation into heat according to the invention. In this example of embodiment, a sole absorber element configured as a ball 38 is arranged in a collector 36, which preferably consists of laminated insulating glass. As it appears from the sectional view, the shape of the collector 36 is preferably adapted to that of the ball 38 and there is only little space with respect to the latter. In the center of the collector 36 there is the absorber formed like a ball 38 that can rotate on an axis 40. Thereby a fluid medium can flow either through or around the absorber 38. Preferably, however, the fluid medium is flowing around the ball 38. Thereby, in particular, the ball 38 must not completely be flown around by the fluid medium but it can also flow along in the lower region between an inlet opening 42 and an outlet opening 44 for the fluid medium. In order to effect a rotation of the ball 38 by the flowing fluid medium, its surface can have projections or recesses, as e.g. milled edges, offering resistance to the flowing means and thus effect a rotation of the ball 38. As it further appears from FIG. 3, an insulating film 46 is surrounding preferably that area not being exposed to direct solar radiation, thus the area between the inlet opening 42 and the outlet opening 44.

Further it can be learned from FIG. 3 in partial view 48 that the collector in at least one area may depart from the symmetrical shape of the ball. Thereby the possibility is given that the flowing fluid medium can occupy spaces of different cross section between the absorber 38 and the collector 36.

Preferably the ball 38 is bedded in a ball cage on balls 50 mounted on the inner walling of the collector.

The embodiment pursuant to FIG. 3 has the advantage that one must not mount any large-area sun collectors e.g. on roofs, which will often lead to undesired reflections. By adequately dimensioning the collector 36 and the ball 38 arranged therein (diameters between 50 cm and 100 cm are easily possible), one can obtain sufficient energies even with a sole absorber element for the warm water supply of a private home, for example.

What is claimed is:

1. A device for the conversion of solar radiation into heat including absorber elements arranged side by side in a heat-insulated collector, at least one surface of which is permeable to solar radiation, and through which a fluid medium flows, characterized by: the absorber elements being rotationally symmetrical bodies configured as balls (28), and being pivotally arranged.

2. A device for the conversion of solar radiation into heat including absorber elements arranged side by side in a heat-insulated collector, at least one surface of which is permeable to solar radiation, and through which a fluid medium flows, characterized by: the absorber elements being rotationally symmetrical bodies configured as cylinders (30), and being pivotally mounted.

3. A device according to claims 1 or 2, wherein the absorber elements (16, 28, 30, 38) have recesses (34) disposed in the flow path of the fluid medium flowing around the absorber elements (16, 28, 30, 38).

4. A device according to claim 3, wherein the speed of rotation of the absorber elements (16, 28, 30, 38) is adjustable by the selection of the arrangement and configuration of the recesses (34).

5. A device according to claim 3, wherein the absorber elements (16, 28, 30) are arranged in at least one plane parallel to the surface (12) permeable to solar radiation.

6. A device for the conversion of solar radiation into heat including at least one rotationally symmetrical absorber element arranged in a heat-insulated collector permeable to solar radiation, and through which a fluid medium flows, characterized by: the absorber element being a single ball (38) pivotally arranged in the collector (36).

7. A device according to claim 6, wherein the fluid medium flowing around the ball turns it.

8. A device according to claim 6 or claim 7, wherein the collector (36) has the shape of the absorber element (38) and is dimensionally adapted to it.

9. A device according to claim 8, wherein the fluid medium partially occupies the space between the ball (38) and the collector (36).

10. A device according to claim 6, wherein the shape of the collector (36) surrounding the ball (38) differs from the symmetrical shape of the ball.

* * * * *